United States Patent
Levy et al.

(10) Patent No.: US 10,764,209 B2
(45) Date of Patent: Sep. 1, 2020

(54) PROVIDING A SNAPSHOT OF BUFFER CONTENT IN A NETWORK ELEMENT USING EGRESS MIRRORING

(71) Applicant: Mellanox Technologies TLV Ltd., Raanana (IL)

(72) Inventors: Gil Levy, Hod Hasharon (IL); Liron Mula, Ramat Gan (IL); Barak Gafni, Campbell, CA (US)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 249 days.

(21) Appl. No.: 15/470,937

(22) Filed: Mar. 28, 2017

(65) Prior Publication Data

US 2018/0288145 A1 Oct. 4, 2018

(51) Int. Cl.
*H04L 12/931* (2013.01)
*H04L 12/26* (2006.01)
*G06F 11/14* (2006.01)
*H04L 12/939* (2013.01)

(52) U.S. Cl.
CPC ........ *H04L 49/208* (2013.01); *G06F 11/1446* (2013.01); *G06F 11/1451* (2013.01); *H04L 43/022* (2013.01); *H04L 43/12* (2013.01); *H04L 49/555* (2013.01); *G06F 11/1402* (2013.01)

(58) Field of Classification Search
None
See application file for complete search history.

(56) References Cited

U.S. PATENT DOCUMENTS

| | | | | |
|---|---|---|---|---|
| 6,801,940 | B1 * | 10/2004 | Moran | H04L 47/10 370/230 |
| 6,920,112 | B1 * | 7/2005 | McCloghrie | H04L 43/022 370/230 |
| 7,730,521 | B1 * | 6/2010 | Thesayi | H04L 63/306 370/230 |
| 7,814,222 | B2 * | 10/2010 | Venables | H04L 47/10 709/232 |
| 7,849,506 | B1 * | 12/2010 | Dansey | H04L 63/1416 713/188 |
| 8,005,084 | B2 | 8/2011 | Kalkunte et al. | |
| 9,282,022 | B2 | 3/2016 | Matthews et al. | |
| 9,331,915 | B1 * | 5/2016 | Brandwine | H04L 43/04 |
| 10,033,602 | B1 * | 7/2018 | Russell | H04L 43/06 |
| 2003/0225549 | A1 * | 12/2003 | Shay | H04L 43/12 702/182 |
| 2006/0143300 | A1 * | 6/2006 | See | H04L 43/026 709/227 |

(Continued)

Primary Examiner — Shirley X Zhang
(74) Attorney, Agent, or Firm — Kligler & Associates Patent Attorneys Ltd

(57) ABSTRACT

A network element includes circuitry and multiple ports. The multiple ports are configured to connect to a communication network. The circuitry is configured to receive multiple packets from the communication network via one or more input ports, and store the received packets in a buffer of the network element, to schedule transmission of the packets stored in the buffer to the communication network via one or more output ports, and in response to a request to provide a snapshot of at least a portion of the buffer, to mirror for transmission, via one or more dedicated ports, only a part of the portion that was received in the network element prior to the request.

22 Claims, 2 Drawing Sheets

(56) References Cited

U.S. PATENT DOCUMENTS

| | | | |
|---|---|---|---|
| 2012/0179816 A1* | 7/2012 | Malloy | H04L 43/00 |
| | | | 709/224 |
| 2014/0078915 A1 | 3/2014 | Edsall et al. | |
| 2014/0086258 A1 | 3/2014 | Kwan et al. | |
| 2014/0126395 A1 | 5/2014 | Matthews et al. | |
| 2014/0133314 A1* | 5/2014 | Matthews | H04L 41/0672 |
| | | | 370/244 |
| 2014/0269379 A1* | 9/2014 | Holbrook | H04L 43/0882 |
| | | | 370/252 |
| 2014/0280829 A1* | 9/2014 | Kjendal | H04L 43/028 |
| | | | 709/223 |
| 2016/0065423 A1* | 3/2016 | Zhang | H04L 47/125 |
| | | | 370/235 |
| 2016/0226725 A1* | 8/2016 | Iizuka | H04L 43/022 |
| 2016/0234091 A1* | 8/2016 | Emmadi | H04L 43/12 |
| 2016/0294659 A1* | 10/2016 | Rusak | H04L 43/10 |
| 2016/0294987 A1* | 10/2016 | Tian | H04L 45/50 |
| 2016/0352601 A1* | 12/2016 | Zhang | H04L 41/0645 |
| 2018/0091387 A1* | 3/2018 | Levi | H04L 43/028 |
| 2018/0091388 A1* | 3/2018 | Levy | H04L 43/026 |
| 2019/0158368 A1* | 5/2019 | Cociglio | H04L 43/026 |
| 2019/0166020 A1* | 5/2019 | Mommileti | H04L 43/022 |

* cited by examiner

PROVIDING A SNAPSHOT OF BUFFER CONTENT IN A NETWORK ELEMENT USING EGRESS MIRRORING

TECHNICAL FIELD

Embodiments described herein relate generally to communication systems, and particularly to methods and systems for providing a snapshot of buffer content of a network element.

BACKGROUND

In various communication networks, network elements such as switches or routers report their internal states for analyzing the network performance. Methods for monitoring and reporting the state of a network element are known in the art. For example, U.S. Patent Application Publication 2014/0078915, whose disclosure is incorporated herein by reference, describes techniques to facilitate the monitoring of occupancy of a buffer in a network device. Packets are received at a network device. Information is captured describing occupancy of the buffer caused by packet flow through the buffer in the network device. Analytics packets containing the information are generated and output from the network device.

U.S. Pat. No. 9,282,022, whose disclosure is incorporated herein by reference, describes a method for diagnosing the performance of a network switch device. The method includes monitoring by a processor data generated by a sensor associated with a network switch device, the data relates to states or attributes of the network switch device. In response to detecting a determined condition in the operation of the network switch device related to the state or attribute, the processor generates an event trigger, and executes a forensic command in response to the event trigger. Executing the command includes sending information relevant to the determined condition for aggregation in computer storage and for analysis.

SUMMARY

An embodiment that is described herein provides a network element that includes circuitry and multiple ports. The multiple ports are configured to connect to a communication network. The circuitry is configured to receive multiple packets from the communication network via one or more input ports, and store the received packets in a buffer of the network element, to schedule transmission of the packets stored in the buffer to the communication network via one or more output ports, and in response to a request to provide a snapshot of at least a portion of the buffer, to mirror for transmission, via one or more dedicated ports, only a part of the portion that was received in the network element prior to the request.

In some embodiments, the circuitry is configured to receive a first packet prior to the request, to receive a second packet after the request, and to mirror to the one or more dedicated ports only the first packet and not the second packet. In other embodiments, the circuitry is configured to mark for mirroring only packets that were received before the request, to check, upon scheduling a packet for transmission via an intended output port, whether or not the packet was marked for mirroring, and to transmit the packet via the one or more dedicated ports in response to verifying that the packet was marked for mirroring. In yet other embodiments, the circuitry is configured to set a flag to a first state before the request and to a second state in response to the request, and to mark the stored packets for mirroring by writing an updated state of the flag in respective packet descriptors.

In an embodiment, the circuitry is configured to detect that reporting the snapshot has completed, by detecting that all data belonging to the part of the portion no longer resides in the buffer. In another embodiment, the circuitry is configured to receive the request by receiving a packet that matches a respective rule in an Access Control List (ACL) of the network element. In yet another embodiment, the circuitry is configured to initiate the request in response to detecting that one or more of the ports are congested.

In some embodiments, the circuitry is configured to receive a criterion for selecting stored packets to report in the snapshot, and to mirror only stored packets that are scheduled for transmission and satisfy the criterion. In other embodiments, the circuitry is configured to mirror a subset of the stored packets that satisfy the criterion. In yet other embodiments, the circuitry is configured to mirror the part of the portion by mirroring for transmission only a header part of the stored packets. In yet further other embodiments, the circuitry is configured to mirror the part of the portion for transmission by applying a data compression scheme to at least a data part of the stored packets to be mirrored.

There is additionally provided, in accordance with an embodiment that is described herein, a method, including, in a network element that includes multiple ports for connecting to a communication network, receiving multiple packets from the communication network via one or more input ports, and storing the received packets in a buffer of the network element. Transmission of the packets stored in the buffer via one or more output ports is scheduled. In response to a request to provide a snapshot of at least a portion of the buffer, only a part of the portion that was received in the network element prior to the request is mirrored for transmission via one or more dedicated ports.

These and other embodiments will be more fully understood from the following detailed description of the embodiments thereof, taken together with the drawings in which:

DETAILED DESCRIPTION OF EMBODIMENTS

Overview

Figure 1:
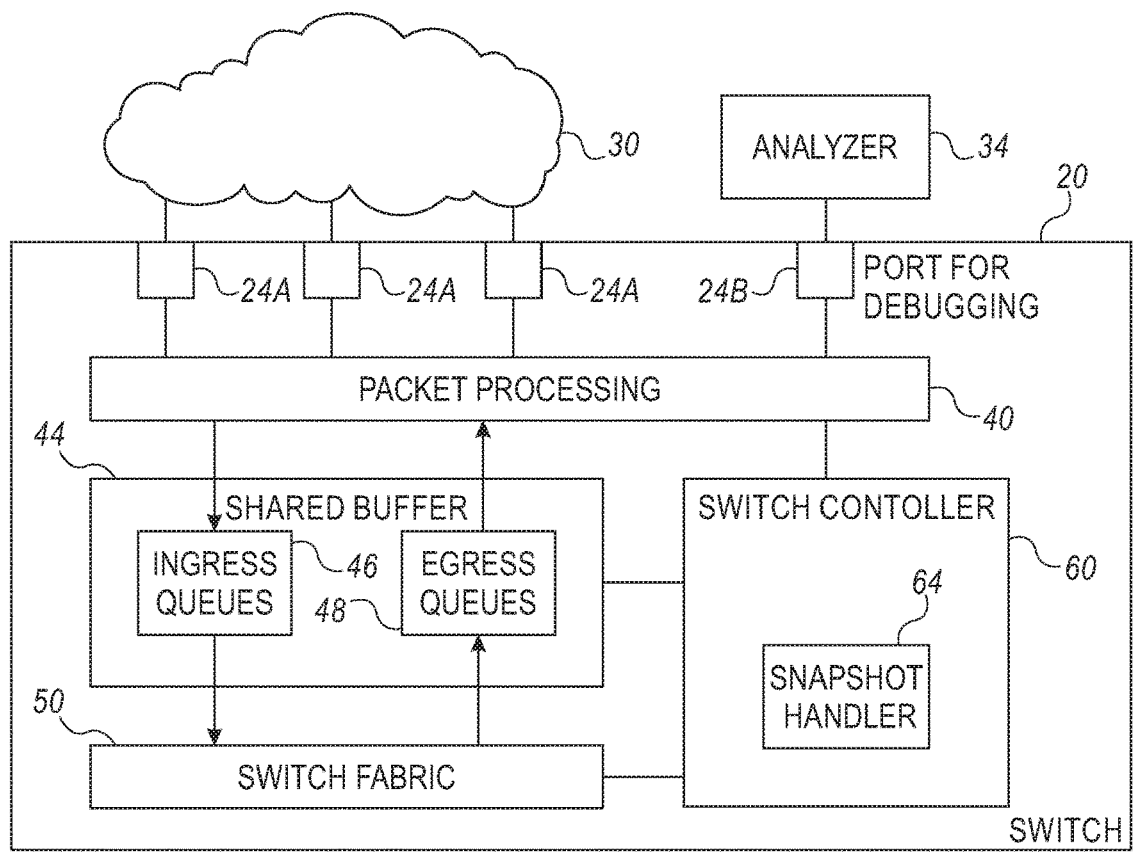
FIG. 1 is a block diagram that schematically illustrates a network switch that supports providing a snapshot of its buffer content, in accordance with an embodiment that is described herein.

A network element such as a switch, router or network processor, typically stores packets received from a communication network in a local buffer, and transmits the stored packets to the communication network via selected output ports, e.g., in accordance with a predefined routing plan.

The performance of a communication network comprising a large number of network elements may degrade for various reasons. For example, congestion or packet drop may occur when the network element routes packets belonging to multiple data flows to a common output port. In the context of the present patent application the term "data flow" refers to a sequence of packets sent from a specific source to a specific destination over the communication network.

Embodiments that are described herein provide improved methods and systems for reporting information from a network element for analysis. In principle, a network element may report for analysis various performance metrics that are evaluated locally. Examples of such metrics include the occupancy levels of queues in the buffer, count metrics such as data-flow counts and congestion-event counts, and statistical metrics of various operational attributes of the network element. The information provided by such metrics, however, is often insufficient for debugging certain failure conditions, such as analyzing performance issues at the data-flow level.

In the disclosed techniques, maximal visibility to the state of the network element is achieved by providing a snapshot of the actual packets (i.e., raw, non-statistical information) stored in the buffer of the network element at a desired time.

In the disclosed techniques, the snapshot includes some or all of the packets stored in the buffer of the network element at snapshot given time. By using such a detailed snapshot, complex failure conditions can be analyzed at fine resolutions that would not be possible without the disclosed techniques. The disclosed techniques are applicable, for example, to network elements that comprise a shared buffer in which the space allocated for queueing packets, as well as various thresholds that serve for detecting failure conditions (e.g., congestion), change dynamically over time.

To produce a snapshot, the network element could freeze the state of the buffer by stopping packet reception and transmission while dumping the buffer content. This approach, however, is disadvantageous for at least two reasons. Firstly, the operation of the network element is undesirably interrupted, and secondly, analyzing failure conditions based on raw buffer content requires complex processing. In the disclosed techniques, the network element provides a snapshot of its buffer content during normal operation, even though the buffer content changes continuously due to packet reception and transmission.

In some embodiments, the network element initiates generation of a snapshot in response to receiving a snapshot request. For example, the network element may receive the snapshot request via a suitable interface. Alternatively, generating the snapshot is triggered by hardware, e.g., in response to detecting a failure condition such as congestion, or in response to receiving a dedicated packet that triggers the snapshot generation.

In the disclosed embodiments, producing the snapshot involves differentiating between packets that were received in the network element before the snapshot request, and packets received after the snapshot request. The network element reports the snapshot by mirroring for transmission, via a dedicated port (or multiple ports), only packets that were received prior to the snapshot request, whereas packets received after the snapshot request are not mirrored and are therefore excluded from the snapshot.

In some embodiments, the switch selects for mirroring packets that are scheduled for transmission and satisfy a predefined condition. For example, the condition may select for mirroring packets that were received via a given port, destined to a given port, have certain priority, resided in a given queue and the like. In an embodiment, the switch copies a scheduled packet that satisfies the condition to an egress queue allocated to the dedicated port. A selective snapshot of the buffer content can therefore be generated and reported to a user via the dedicated port.

In some embodiments, the switch marks packets for mirroring by writing, in respective packet descriptors of the stored packets, an updated state of a snapshot flag that has two possible states. The switch initializes the flag before receiving the snapshot request to one of the states, and flips the flag to the other state in response to receiving the snapshot request. Upon scheduling a given packet for transmission, the switch checks the packet descriptor, and if the value in the descriptor differs from the current value of the flag, mirrors the packet to the dedicated port.

In some embodiments, mirroring the packets involves applying additional processing to the packets to be mirrored, e.g., to reduce the bandwidth required for transmitting the mirrored packets. In an example embodiment, the switch samples the mirrored packets so that only a subset of the selected packets for mirroring will actually be mirrored. In another embodiment, the switch mirrors only the header part of the packets. In yet another embodiment, the switch applies data compression to the data part of the packets to reduce the packet size.

System Description

FIG. 1 is a block diagram that schematically illustrates a network switch 20 that supports providing a snapshot of its buffer content, in accordance with an embodiment that is described herein. Network switch 20 is also referred to simply as "switch" for brevity.

Switch 20 comprises multiple ports 24 for connecting to other network elements or network nodes (not shown). In the present example, the switch connects via multiple ports 24A to a communication network 30, and via port 24B to an analyzer 34 for debugging purposes. In alternative embodiments, the analyzer is comprised within the communication network. Each of ports 24A and 24B functions both as an input port for receiving incoming packets from the communication network or analyzer, and as an output port for transmitting outgoing packets to the communication network or analyzer. Alternatively, a given port can function as either an input or output port.

Communication network 30 may comprise a packet network such as an IP network or an Ethernet network operating in accordance with any suitable standards of protocols. In alternative embodiments, the disclosed techniques can be implemented in other kinds of network elements such as routers, bridges or network processors. The network element and communication network may operate in accordance with any other suitable communication standard or protocol, such as InfiniBand (IB).

Analyzer 34 comprises an analyzer processor (not shown) that analyzes the performance of communication network 30 based on status reports received from switch (and possibly from other network elements). In some embodiments, the network switch exchanges various messages with analyzer 34 via port 24B. For example, switch 20 may receive from analyzer 34 a command for reporting an updated state of the switch. Based on the reported state, analyzer 34 can identify failure conditions in switch 20 and/or communication network 30, and take corrective measures such as, for example, reconfiguring switch 20 as required.

Although in the present example analyzer 34 connects to the switch via one of ports 24, in alternative embodiments, analyzer 34 communicates with the switch and receives snapshot reports from the switch via a management interface (not shown in the figure).

In the example of FIG. 1, analyzer 34 connects locally to switch 20 via port 24B. In alternative embodiments, analyzer 34 comprises a central entity, which receives reports for analysis from one or more network elements, e.g., such as switch 20, over communication network 30.

Switch 20 comprises a packet processing module 40 for processing incoming and outgoing packets, and a shared buffer 44 that manages various aspects of allocating buffering resources, e.g., for storing the received packets before being transmitted back to the communication network.

Shared buffer 44 comprises one or more ingress queues 46 for storing packets arriving from the network via ports 24A, and one or more egress queues 48 for storing packets awaiting transmission to the communication network via ports 24A. In shared buffer 44, queues of different sizes may be dynamically allocated to different data flows or to different input or output ports. In alternative switch embodiments, a conventional buffer in which the queues have the same size can also be used.

In the ingress direction, packet processing module applies to the received packets various processing such as verifying the correctness of the data in the packet payload, packet classification and prioritization, and routing. To this end, the packet processing module typically checks certain fields in the packets headers such as source and destination addresses, port numbers, and the underlying network protocol used. In the egress direction, packet processing module 40 schedules the transmission of packets stored in egress queues 48 via respective output ports using any suitable arbitration scheme.

In some embodiments, switch 20 temporarily stores packets for which there is no available egress queue or packets whose processing has not yet completed, in ingress queues 46 of shared buffer 44. Switch 20 stores packets whose routing has been resolved and awaiting transmission in egress queues 48 of the shared buffer. In some embodiments, in addition to the ingress and egress packet-queues, the switch comprises means (e.g., various counters and data structures such as packet descriptors) for identifying the packets in the shared buffer that were received via a given input port (and possibly stored in multiple ingress queues). Similarly, the switch can count and identify all the packets in the shared buffer that are destined to a given output port (and possibly stored in multiple egress queue).

Switch 20 further comprises a configurable switch fabric 50, which forwards packets between input and output ports 24A, via the respective queues, e.g., in accordance with a predefined routing plan. In some embodiments, switch fabric 50 is implemented using a Forwarding Database (FDB) (not shown in the figure) that stores associations between pairs of input and output ports.

Alternatively, switch 20 can hold a set of routing rules, e.g., per data flow. Forwarding the packets is typically based on calculating a hash function over certain fields in the packet headers, e.g., one or more of the fields: source address, destination addresses, underlying protocol, source port number and destination port number.

Typically, each packet belongs to a certain data flow. By routing packets of a certain data flow to a certain port, switch fabric 50 causes the packets of that data flow to be delivered over a certain routing path through communication network 30. Depending on the routing plan, switch 20 may route multiple data flows to a common output port simultaneously.

In the context of the present patent application and in the claims, the term "packet" is used to describe the basic data unit that is routed through the network. Different network types and communication protocols use different terms for such data units, e.g., packets, frames or cells. All of these data units are regarded herein as packets.

Switch 20 further comprises a switch controller 60, which performs various management and packet-processing functions of switch 20. For example, switch controller configures switch fabric 50 to apply the desired routing plan. By controlling the routing plan, switch 20 is able to cause the packets to traverse various routing paths through communication network 30. In some embodiments, switch controller 60 re-routes a given data flow in response to receiving a re-configuration command, e.g., from analyzer 34.

Switch controller 60 comprises a snapshot handler 64 that produces a snapshot of the content in shared buffer 44, on demand. The main tasks carried out by the snapshot handler include:

Receiving a snapshot configuration that comprises (i) a triggering configuration that specifies conditions for initiating the snapshot production, and (ii) buffering configuration that specifies parts of the shared buffer to be included in the snapshot report.

Initiating snapshot production in response to a snapshot request. The snapshot request can be received, e.g., from the analyzer via ports 24B. Alternatively or additionally, the snapshot is received via any other suitable interface. Further alternatively or additionally, the snapshot request is triggered internally by some hardware event. In the description that follows, the term "receiving a snapshot request" refers to both receiving the snapshot request from outside the switch and to initiating the snapshot request internally within the switch.

Virtually freezing the buffer content for producing the snapshot by differentiating between packets in the shared buffer that were received prior to and after receiving the snapshot request.

Reporting the requested snapshot, by mirroring, via dedicated port 24B, packets that are scheduled for transmission to their intended destination, were received before the snapshot request, and satisfy the buffering configuration.

In the context of the present patent application and in the claims, the term "mirroring" means duplicating certain buffer content and sending the duplicated content to the dedicated port (e.g., to an egress queue associated with the dedicated port), possibly after applying to this content some processing. Such processing may be advantageous for reducing the size of the mirrored content, as will be described further below. The mirrored content will be transmitted both to its intended destination via its intended egress port, and to another different destination via the dedicated port.

Note that in practical implementations, some delay may exist between the instance of receiving the snapshot request and the actual point in time of (virtually) freezing the buffer content for producing the snapshot. In the context of the present patent application and in the claims, the phrase "before receiving the snapshot request" means any time between the time of receiving the snapshot request, and the actual time after which the switch excludes the received packets from the snapshot.

The buffering configuration is provided to the snapshot handler before receiving the snapshot request, or as part of the snapshot request. The buffering configuration may be provided to the switch by a network administrator, e.g., using analyzer 34 via port 24B, or using any other suitable interface. By defining separate triggering and buffering configurations, the switch can generate a snapshot under complex scenarios. For example, the triggering configuration specifies to trigger a snapshot in response to detecting a congestion condition in a given queue, and when this trigger actually occurs, the switch generates a snapshot of this given queue in the buffer, or a snapshot of all the queues in the buffer whose packets are destined to the same port as the given queue.

In some embodiments, the snapshot handler differentiates between packets received before and after the snapshot request by marking for mirroring only packets that were received in the switch before the snapshot request. In another embodiment, the snapshot handler marks packets that were received before the snapshot request differently than packets received after the snapshot request. For example, the snapshot handler holds a snapshot flag (not shown), and marks the received packets (e.g., when being stored in the buffer) based on the current value of the snapshot flag, which gets different respective values before and after receiving the snapshot request.

In some embodiments, the switch stores for the packets in the shared buffer respective packet descriptors. The packet descriptor contains metadata that may include, for example, a pointer to the starting address in the buffer in which the actual packet resides, packet size, input port via which the packet was received, output port via the packet will be transmitted and the like. In some embodiments, the packet descriptor contains a dedicated field, which snapshot handler 64 uses for marking the packets for mirroring.

The configurations of switch 20, communication network 30 and analyzer 34 shown in FIG. 1 are example configurations, which are chosen purely for the sake of conceptual clarity. In alternative embodiments, any other suitable switch, communication network and analyzer configurations can be used. Some elements of switch 20, such as snapshot handler 64, may be implemented in hardware, e.g., in one or more Application-Specific Integrated Circuits (ASICs) or Field-Programmable Gate Arrays (FPGAs). Additionally or alternatively, some switch elements, for example switch controller 60, can be implemented using software, or using a combination of hardware and software elements. Shared buffer 44 may be implemented using any suitable memory, such as Random Access Memory (RAM).

In the context of the present patent application and in the claims, the term "circuitry" refers to all the elements of switch 20 excluding ports 24. In FIG. 1, the circuitry comprises packet processing module 40, shared buffer 44, switch fabric 50 and switch controller 56, including snapshot handler 64.

In some embodiments, some of the functions of the circuitry, e.g., switch controller 60, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
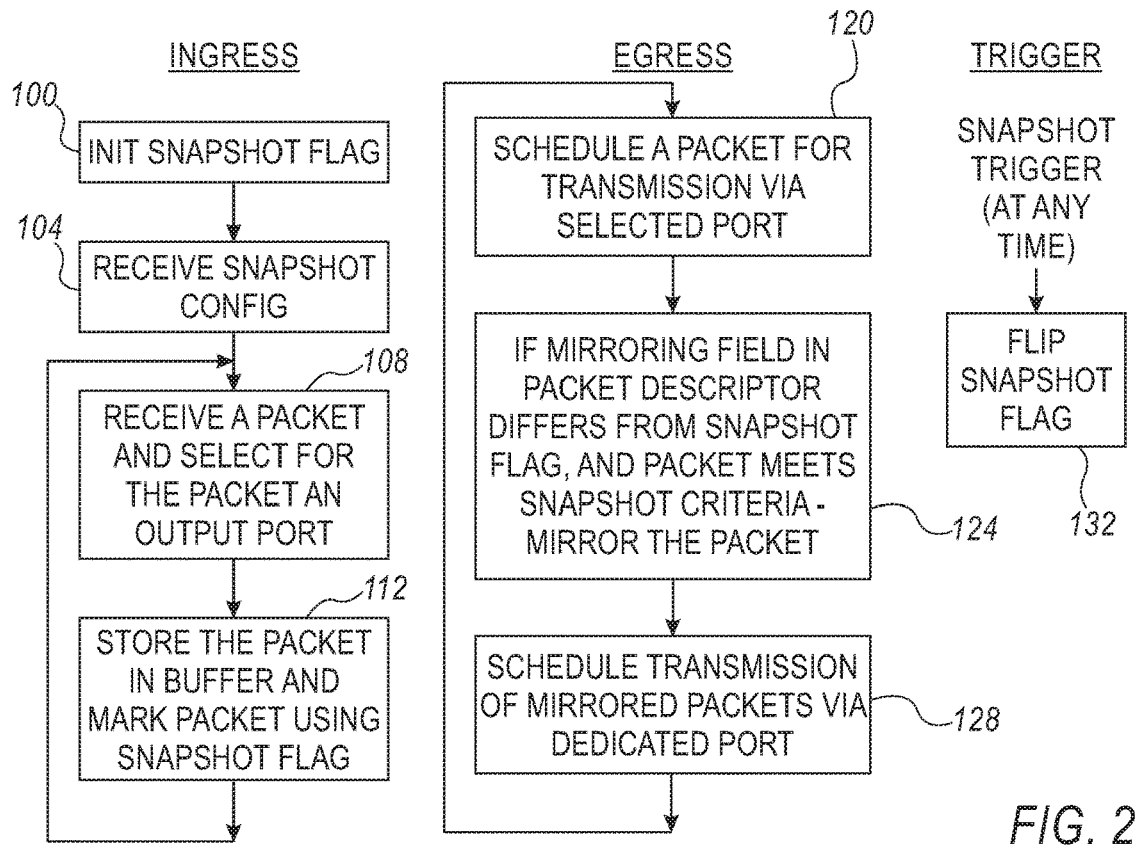
FIG. 2 is a flow chart that schematically illustrates a method for providing a snapshot of packets buffered in a network switch using egress mirroring, in accordance with an embodiment that is described herein.

FIG. 2 is a flow chart that schematically illustrates a method for providing a snapshot of packets buffered in a network switch using egress mirroring, in accordance with an embodiment that is described herein.

The method of FIG. 2 includes ingress and egress parts that are typically executed by switch 20 in parallel, and a trigger part that may occur at any time during the execution of the ingress and egress parts, e.g. asynchronously. In general, the ingress part handles packet reception and storage, the egress part handles packet transmission and mirroring for reporting a snapshot, and the trigger part handles changing the value of a snapshot flag in response to receiving a snapshot request. In the example of FIG. 2, the snapshot flag is binary, i.e., has two possible values, e.g., '0' and '1'.

The ingress part of the method begins with the snapshot handler initiating the snapshot flag to one of its possible values at an initialization step 100. The snapshot flag uses for differentiating between packets received prior to receiving a snapshot request and packets received after the snapshot request. At a snapshot configuration step 104, the snapshot handler receives a snapshot configuration that comprises a triggering configuration and a buffering configuration.

The buffering configuration specifies which of the packets stored in the buffer at the time of the snapshot request are to be included in the snapshot report. Example buffering configurations include:

Packets received via a given input port.
Packets received via a given input port and have certain priority levels.
Packets destined to a given output port.
Packets destined to a given output port and have certain priority levels.
Packets stored in a specific queue in the shared buffer.

In some embodiments, a buffering configuration that specifies a pair of an output port plus a single priority level is equivalent to specifying an egress queue allocated for such packets in the buffer. The buffering configuration can also combine one or more definitions such as those described above, e.g., specify for the snapshot all the packets received via multiple specific input ports, destined to a given output port, and have a certain priority level.

In an embodiment, the switch supports a snapshot that includes certain packets, and up to the entire collection of packets that are stored in the buffer before the snapshot request. Such a wide buffering configuration, however, may have bandwidth implications, as will be described in detail below.

The triggering configuration specifies conditions for initiating a snapshot generation. In some embodiments, the triggering configuration specifies that producing the snapshot is initiated manually, e.g., by providing a snapshot request to the snapshot handler via the switch controller, e.g., using a suitable software-interface (not shown).

Alternatively, the triggering configuration specifies a hardware-driven trigger as will be described herein. In some embodiments, packet processing module 40 queries the packets received in the switch against one or more Access Control Lists (ACLs) (not shown) that each comprises one or more entries. An ACL entry typically comprises a rule and a respective action (e.g., forward or discard the packet) to be applied to a packet that matches the rule. In some embodiments, the ACL holds a dedicated rule, for which the respective action requires providing a snapshot of shared buffer 44. In such embodiments, the snapshot request is trigged in response to receiving a packet that matches the dedicated rule.

In another embodiment, the triggering configuration specifies that generating the snapshot is triggered upon detecting a predefined hardware-based condition, e.g., a failure condition, within the switch. For example, the failure condition occurs because of one or more of the switch ports being congested.

The switch may detect congestion using any suitable method, such as, for example, by identifying that the occupancy level of a given queue exceeds a congestion threshold. Alternatively or additionally, the switch can detect congestion by measuring the filling and emptying rates of one or more the queue in the buffer. As another example, the switch detects a failure condition in response to dropping one or more packets due to lack of buffering space, using packet-dropping schemes such as tail-drop or Weighted Random Early Detection (WERD).

At a reception step 108, the network switch receives a packet from the communication network via one of the input ports, and selects for the received packet a respective output port, e.g., in accordance with a preconfigured routing plan. At a storage step 112, the switch stores the received packet in a queue that was allocated for the selected output port within the shared buffer.

In an embodiment, each packet is stored along with a respective descriptor that has a dedicated mirroring field. The snapshot handler marks the packets stored in the shared buffer, by setting the mirroring fields in the respective descriptors based on the value of the snapshot flag. As will be described below, the value of the snapshot flag changes in response to receiving the snapshot request, which results in different marking for packets received before the snapshot request and packets received after the snapshot request. Following step 112 the method loops back to step 108, to receive subsequent packets from the communication network.

The egress part of the method begins with the packet processing module scheduling a packet stored in the shared buffer for transmission at a scheduling step 120. The packet is scheduled for transmission via the output port that was selected for the packet at step 108.

At a mirroring-check step 124, the snapshot handler checks the mirroring field in the packet descriptor as well as additional snapshot criteria for deciding whether the scheduled packet requires mirroring. In some embodiments, the snapshot criteria comprise at least the conditions i) the mirroring filed in the packet descriptor has a different value than the current value of the snapshot flag, which indicates that the packet was received before the snapshot request, and ii) the packet satisfies the buffering configuration of the snapshot configuration received at step 104.

In some embodiments, packets selected for mirroring may undergo additional processing such as sampling, transmitting only part of the packet content and data compression, as will be described below. In some embodiments, the mirrored packets are stored in a dedicated egress queue allocated to dedicated output port 24B, to be transmitted to analyzer 34. The processing may be applied before storing the mirrored packets in the dedicated egress queue, or when the mirrored packets are scheduled for transmission.

At a snapshot reporting step 128, the switch controller schedules transmission of the packets that were mirrored at step 124 via the dedicated port, and the method loops back to step 120 to schedule the transmission of an additional packet queued in the shared buffer.

The trigger part of the method includes a triggering step 132, at which the snapshot handler receives a snapshot request, and in response, flips the value of the binary snapshot flag, e.g., from '1' to '0' (or vice versa). As a result, packets received after flipping the snapshot flag will be marked (in the mirroring field of the respective packet descriptors) with a complementary binary value compared to the packets received before flipping the snapshot flag. When the packets that were marked with the flipped value will be scheduled for transmission at step 120, these packets will fail to meet part (i) of the snapshot criteria described above, and therefore will not be mirrored, and will not be part of the reported snapshot.

The snapshot handler may receive a snapshot request, e.g., as a result of a hardware event, before reporting a snapshot that was initiated earlier has concluded, which may interfere with correct snapshot reporting. In some embodiments, the snapshot handler ignores snapshot requests that arrive before the reporting of an active snapshot concludes. In such embodiments, the snapshot handler flips the snapshot flag at step 132 only after validating that the reporting of any previously triggered snapshot has concluded.

In some embodiments, the snapshot handler supports reporting a single snapshot at a time. As a result, the snapshot handler needs to identify that the reporting of one snapshot has concluded before starting to generate another snapshot. The snapshot handler can detect that a snapshot has concluded in various ways. In general, reporting the snapshot concludes when all the packets to be mirrored no longer reside in the shared buffer. In an example embodiment, in response to receiving a snapshot request, the snapshot handler saves one or more packet-counts of the packets queued in the shared buffer, which satisfy the buffering configuration of the snapshot configuration. When a mirrored packet is scheduled for transmission via the dedicated port, the snapshot handler decrements the relevant packet-count, accordingly. The snapshot handler detects that reporting the snapshot has completed, in response to detecting that all of the packet-counts become zero.

In alternative embodiments, the snapshot handler receives an indication that reporting the snapshot has concluded from the analyzer. For example, the analyzer sends the indication in response to detecting that the time that has elapsed since the analyzer received the first packet of the snapshot report is longer than a predefined duration, e.g., a preconfigured aging time used by the switch to remove from the buffer packets older than the aging time.

In some embodiments, the snapshot handler mirrors the packets with an extended header part. For example, the snapshot handler adds to the header of the mirrored packet metadata such as the input port via which the packet was received, output port via which the packet is sent to its intended destination, ingress and/or egress queues in which the packet was stored, the size of the packet as stored in the shared buffer and the like. The analyzer may use such metadata to classify the packets in the stream of mirrored packets for analysis, e.g., according to one or more of the metadata attributes.

Performance Implications Due to Snapshot Reporting

In the disclosed embodiments, the packets that are mirrored for transmission via a single dedicated port are typically transmitted via multiple ports to their intended destinations. The bandwidth across the ports towards the network may be much larger than the bandwidth available for transmitting the mirrored packets via the dedicated port. As a result, the queued mirrored packets may force the switch to delay the transmission of the original packets to their intended destination, which degrades the throughput of the switch during the snapshot reporting.

In some embodiments, to accommodate the limited bandwidth for reporting the snapshot, the snapshot handler reduces the required bandwidth by applying to the mirrored packets additional processing.

One simple approach to accommodate the limited bandwidth for reporting the snapshot is to specify only a limited portion of the buffer in the buffering configuration, e.g., a single queue or a single output port. Moreover, the analyzer can request several different snapshots at different times and analyze the network performance based on the multiple snapshots.

In some embodiments, the snapshot handler samples the mirrored packets according to some sampling scheme, which results in transmitting to the dedicated port only a partial subset of the mirrored packets. For example, the snapshot handler may actually mirror one out of a predefined number N of the packets selected for mirroring. The sampling ratio 1/N depends on the bandwidth ratio between the number of all the transmitted packets and the number of the actually mirrored packets. In an example embodiment N=10, and therefore only 10% of the packets that were selected for mirroring are actually mirrored and included in the snapshot report. In other embodiments, the switch may sample the mirrored packets randomly, e.g., in accordance with a suitable pseudo-random selection scheme.

In many practical situations, the analyzer evaluates the network performance based only on the information available in the headers of the packets reported in the snapshot. In such cases, the snapshot handler reduces the bandwidth required for transmitting the mirrored packets, in an embodiment, by queueing to for transmission to the analyzer only the header part of the packets selected for mirroring. For example, assuming a packet size of 512 Bytes of which the header part comprises 128 Bytes, the header parts alone consumes only 25% of the bandwidth that would be required to transmit the full packet size.

In some embodiments, the snapshot handler reduces the bandwidth required for transmitting the mirrored packets by applying a data compression procedure to at least the data part of the mirrored packets. The snapshot handler may apply any suitable data compression method such as, for example, the GZIP data compression method. The compression ratio typically depends on the actual content in the packet payload.

Example of Producing a Snapshot

In the description that follows we describe an example of snapshot generation in a network switch. The example is described with reference to FIG. 3A and FIG. 3B.

Figures 3A, 3B:
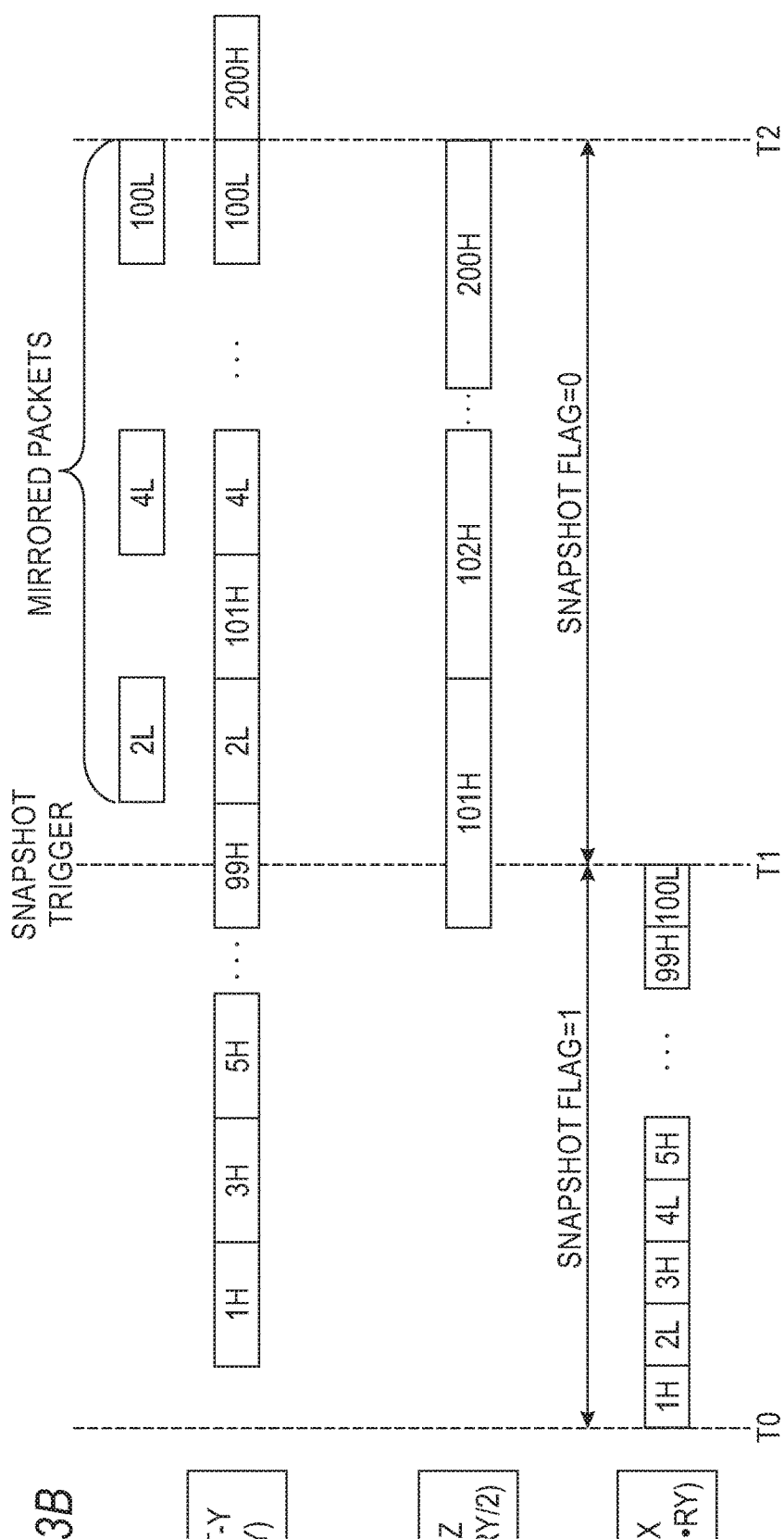
FIG. 3A is a block diagram of that schematically illustrates a simplified view of the network switch depicted in FIG. 1, in accordance with an embodiment that is described herein.
FIG. 3B is a diagram that schematically illustrates an example of producing a snapshot of the buffer of the switch of FIG. 3A, in accordance with an embodiment that is described herein.

FIG. 3A is a block diagram of that schematically illustrates a simplified view of the network switch depicted in FIG. 1, in accordance with an embodiment that is described herein. FIG. 3B is a diagram that schematically illustrates an example of producing a snapshot of the buffer of the switch of FIG. 3A, in accordance with an embodiment that is described herein.

The simplified view of network switch in FIG. 3A depicts only elements of network switch 20 that are required for the present example. Ports 24A of the network switch in FIG. 3A are denoted IN-X and IN-Z and OUT-Y and serve as input ports, and as an output port, respectively, connecting to a communication network (30). Port 24B is denoted DBG and serves for connecting to an analyzer (34). In the present example, egress queues 48 of the network switch are denoted Q_LOW and Q_HIGH for storing low-priority and high-priority packets, respectively.

The network switch receives packets via ports IN-X and IN-Z. The received packets are assigned low-priority or high-priority level, and the switch stores the packets in Q_LOW or Q_HIGH according the respective priority levels. We further assume that:

All the packets received via ports IN-X and IN-Z are destined to port OUT-Y.

In delivering packets to port OUT-Y, high-priority packets always precede low-priority packets.

Port OUT-Y transmits data to the network at a rate denoted RY.

Port IN-X receives data at a rate RX that is twice as fast as the rate of port OUT-Y, i.e., RX=2·RY, and port IN-Z receives data at a rate RZ that is half the rate of port OUT-Y, i.e., RZ=RY/2.

The switch was configured with a snapshot configuration in which the buffering configuration specifies low-priority packets that are received via port IN-X and destined to port OUT-Y. The triggering configuration specifies the trigger condition as the occupancy level in Q_LOW reaching 50 packets or more.

In the diagram of FIG. 3B, the switch starts receiving a sequence of 100 packets via port IN-X, at time T0. The packets are numbered 1 . . . 100 and their assigned priorities are denoted 'H' and 'L' for high and low priorities, respectively. As seen in FIG. 3B, the packets arriving via port IN-X have interleaved priorities, 1H,2L,3H, . . . ,99H,100L. The switch therefore stores the odd numbered packets 1H, 3H, . . . ,99H in Q_HIGH, and the even numbered packets 2L,4L, . . . ,100L in Q_LOW. The switch marks each of the packets 1 . . . 100 with the snapshot flag value '1'.

Since RX=2·RY, during the reception of the 100 packets via port IN-X, only 50 of these packets are egressed via port OUT-Y. Based on the arbitration policy, the packets 1H, 3H, . . . ,99H are egressed from Q_HIGH, whereas the packets 2L,4L, . . . ,100L are being stored in Q_LOW.

At time T1, received packet 100L is stored in Q_LOW, and the occupancy level in Q_LOW reaches 50 packets, which triggers generating the snapshot. In response to the trigger, the switch flips the value of the snapshot flag from '1' to '0'. Note that at time T1, the high-priority packets were already transmitted (99H partially transmitted) and therefore do not reside in the buffer at the trigger time and will not be included in the snapshot report.

In parallel to receiving packet 100L via port IN-X, the switch starts receiving high-priority packets 101H . . . 200H via port IN-Z at a rate RZ=RY/2. Packets 101H . . . 200H are marked with the updated snapshot flag value '0'. Since the transmission of packet 99H empties Q_HIGH, the switch then starts transmitting packet 2L from Q_LOW. Packet 2L satisfies the buffering configuration and its marking value is different than the current value of the snapshot flag, and is therefore mirrored as part of the snapshot.

Similar arguments apply to the packets 2L,4L, . . . ,100L and 101H . . . 200H and, as seen in the figure, only the packets 2L,4L, . . . ,100L that were received before the snapshot trigger (T1) are mirrored via port DBG. At time T2, the transmission of packet 100L ends, and reporting the snapshot concludes.

Note that in general, even if between T1 and T2 both Q_LOW and Q_HIGH contained packets, only the packets in Q_LOW would have been mirrored, in accordance with the snapshot configuration.

The embodiments described herein are given by way of example, and other suitable embodiments can also be used.

For example, in the embodiments described above, the switch typically produces one snapshot at a time. In alternative embodiments, multiple snapshots can be produced and reported simultaneously. Support for multiple snapshots can be implemented in various ways. For example, in one embodiment, the switch manages multiple snapshot flags, each having distinct two values and is associated with a respective snapshot configuration. In another embodiment, the switch manages a snapshot flag that can have more than two values for supporting the multiple snapshots.

In the embodiments described above, the switch reports the snapshot via a single dedicated port. In alternative embodiments, however, the switch may report the snapshot via multiple dedicated ports. In an embodiment, the switch reports the snapshot via multiple ports that belong to a common Link Aggregation Group (LAG).

Although the embodiments described above refer mainly to producing a snapshot of the buffer content on the fly, the disclosed embodiments are similarly applicable for off-line debugging in which traffic flow via the switch is stopped for producing the snapshot.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A network element, comprising:
multiple ports, configured to serve as one or more input ports and one or more output ports for communicating over a communication network, the ports including one or more dedicated ports for minoring;
a buffer for storing packets received from the communication network via the input ports; and
circuitry, which is configured to:
receive a snapshot request, which requests the network element to provide a snapshot of at least a portion of the buffer;
receive from the communication network packets to be stored in the buffer, and mark each received packet to indicate whether the packet was received before or after the snapshot request;
schedule transmission of the packets stored in the buffer to the communication network via the output ports; and
mirror for transmission, via the one or more dedicated ports, only scheduled packets that are marked as having been received before the snapshot request,
wherein the circuitry comprises a snapshot handler that holds a snapshot flag associated with the snapshot, and wherein the circuitry is configured to flip the snapshot flag upon receiving the snapshot request, and to mark each received packet to indicate whether the packet was received before or after the snapshot request, by writing the snapshot flag into a descriptor of the packet.

2. The network element according to claim 1, wherein the circuitry is configured to receive a first packet prior to receiving the snapshot request, to receive a second packet after receiving the snapshot request, and to minor for transmission via the one or more dedicated ports only the first packet and not the second packet.

3. The network element according to claim 1, wherein the circuitry is configured to check, upon scheduling a packet for transmission via an intended output port, whether the packet was marked as received before or after the snapshot request, and to transmit the packet via the one or more dedicated ports in response to verifying that the packet was marked as received before the snapshot request.

4. The network element according to claim 1, wherein the circuitry is configured to detect that reporting the snapshot has completed, by detecting that all the packets belonging to the portion of the buffer, and that are marked as received before the snapshot request, no longer reside in the buffer.

5. The network element according to claim 1, wherein the circuitry is configured to receive the snapshot request by receiving a packet that matches a respective rule in an Access Control List (ACL) of the network element.

6. The network element according to claim 1, wherein the circuitry is configured to initiate the snapshot request in response to detecting that one or more of the ports are congested.

7. The network element according to claim 1, wherein the circuitry is configured to receive a criterion for selecting stored packets to report in the snapshot, and to mirror only scheduled packets that are marked as received before the snapshot, and that satisfy the criterion.

8. The network element according to claim 7, wherein the circuitry is configured to mirror a selected subset of the scheduled packets that are marked as received before the snapshot and that satisfy the criterion.

9. The network element according to claim 1, wherein the circuitry is configured to mirror for transmission only a header part of the scheduled packets.

10. The network element according to claim 1, wherein the circuitry is configured to apply a data compression scheme to at least a data part of the stored packets to be mirrored.

11. The network element according to claim 1, wherein the circuitry is configured to mirror for transmission only scheduled packets whose descriptors match the snapshot flag held in the snapshot handler.

12. A method, comprising:
in a network element that comprises multiple ports that serve as one or more input ports and one or more output ports for communicating over a communication network, the ports including one or more dedicated ports for mirroring, receiving a snapshot request, which requests the network element to provide a snapshot of at least a portion of a buffer of the network element, wherein the buffer stores packets received from the communication network via the input ports;
receiving from the communication network packets to be stored in the buffer, and marking each received packet to indicate whether the packet was received before or after the snapshot request;
scheduling transmission of the packets stored in the buffer via the output ports; and
mirroring for transmission, via the one or more dedicated ports, only scheduled packets that are marked as having been received before the snapshot request,
wherein the network element comprises a snapshot handler that holds a snapshot flag associated with the snapshot, and comprising flipping the snapshot flag upon receiving the snapshot request, and wherein marking each received packet comprises writing the snapshot flag into a descriptor of the packet.

13. The method according to claim 12, wherein receiving the packets comprises receiving a first packet prior to receiving the snapshot request and receiving a second packet after receiving the snapshot request, wherein minoring the scheduled packets comprises minoring for transmission via the one or more dedicated ports only the first packet and not the second packet.

14. The method according to claim 12, wherein scheduling the transmission comprises checking, upon scheduling a packet for transmission via an intended output port, whether or not the packet was marked as received before or after the snapshot request, and transmitting the packet via the one or more dedicated ports in response to verifying that the packet was marked as received before the snapshot request.

15. The method according to claim 12, and comprising detecting that reporting the snapshot has completed, by detecting that all the packets belonging to the portion of the buffer, and that are marked as received before the snapshot request, no longer resides in the buffer.

16. The method according to claim 12, wherein receiving the snapshot request comprises receiving a packet that matches a respective rule in an Access Control List (ACL) of the network element.

17. The method according to claim 12, and comprising initiating the snapshot request in response to detecting that one or more of the ports are congested.

18. The method according to claim 12, and comprising receiving a criterion for selecting stored packets to report in the snapshot, wherein mirroring the scheduled packets comprises minoring only scheduled packets that are marked as received before the snapshot, and that satisfy the criterion.

19. The method according to claim 18, wherein mirroring the scheduled packets comprises mirroring a selected subset of the scheduled packets that are marked as received before the snapshot and that satisfy the criterion.

20. The method according to claim 12, wherein mirroring the scheduled packets comprises mirroring for transmission only a header part of the scheduled packets.

21. The method according to claim 12, wherein mirroring the scheduled packets comprises applying a data compression scheme to at least a data part of the stored packets to be mirrored.

22. The method according to claim 12, wherein mirroring for transmission comprises minoring for transmission only scheduled packets whose descriptors match the snapshot flag held in the snapshot handler.

* * * * *